Feb. 1, 1944.        R. L. DRAKE         2,340,312
              MOTOR CONSTRUCTION
              Filed Feb. 14, 1942      2 Sheets-Sheet 1

INVENTOR
Robert L. Drake
BY Richard A. Marsa
ATTORNEY

Feb. 1, 1944.          R. L. DRAKE          2,340,312
MOTOR CONSTRUCTION
Filed Feb. 14, 1942          2 Sheets-Sheet 2

INVENTOR
Robert L. Drake
BY Richard A. Marsen
ATTORNEY

Patented Feb. 1, 1944

2,340,312

UNITED STATES PATENT OFFICE

2,340,312

MOTOR CONSTRUCTION

Robert L. Drake, Piqua, Ohio, assignor, by mesne assignments, to Lear Avia, Inc., Piqua, Ohio, a corporation of Illinois Application February 14, 1942, Serial No. 430,929

7 Claims. (Cl. 171—252)

This invention relates to electric motors particularly useful for aircraft installations where maximum efficiency, simplicity, minimum weight and compactness are at a premium.

The motor of the present invention embodies stator laminations incorporated in the motor framework and arranged with projections to effectively dissipate heat generated within the motor. A novel feature of the invention resides in the provision of stator cooling fins with a series of stator laminations of the same shape and size. The laminations are arranged in similar groups which are alternated to constitute the radiating fin structure. The stator plates are exposed, and constitute a portion of the body of the motor. The invention arrangement affords a substantially increased heat radiating surface, resulting in increased operating efficiencies over motors of comparable prior types size.

The cross-section of the motor components are the same for different motor sizes, different motor ratings being accomplished by varying only the overall motor length. The invention is practicable for motors either of the direct current or alternating current types, and is particularly advantageous where compact highly efficient motors are required, as aboard an aircraft. Most of the electric motors used on an aircraft are of the intermittent type. A given maximum power output can be provided for such intermittent duty by a motor of much smaller size and weight than previously available, where the heat radiation feature of my invention is incorporated.

These and further advantages, capabilities and objects of the present invention will be apparent in the following description of a preferred embodiment thereof, illustrated in the drawings, in which.

Figure 1:
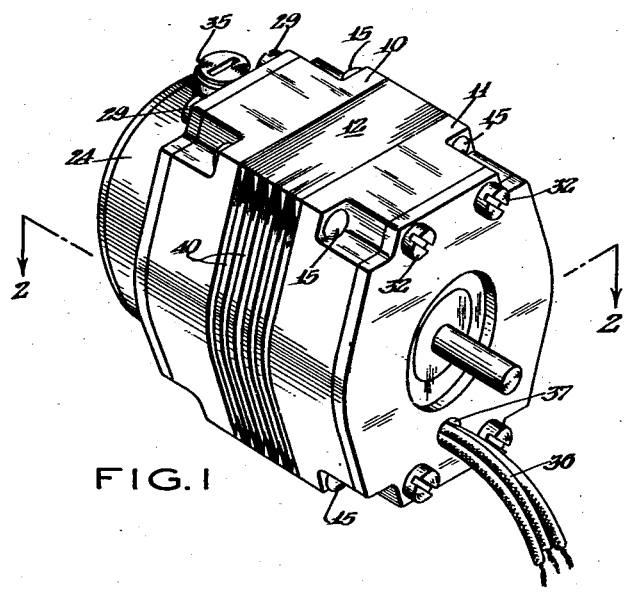
Fig. 1 is a perspective illustration of a motor embodying the principles of the invention.

The motor of the invention is compact and designed with a minimum weight and bulk for a given power rating. The motor is constructed with components of a simplified form and assembly, resulting in a motor that is readily serviced, maintained and repaired, and relatively inexpensive to manufacture, without sacrifice in stability, durability or the reliability required of aircraft motors. By providing a very efficient radiating arrangement, the invention motor may be operated at higher current and power ratings than comparable motors of given dimensions and wire size.

The invention is illustrated in connection with a direct current type of motor. However, it is to be understood that it is equally applicable to motors of the alternating current variety. The illustrated motor comprises a stator constructed with two similar end rings 10, 11, with a series of stator laminations 12 secured between them. The end rings and laminations are formed into an integral unit by four pins 15, the heads of which are riveted over. Stator windings 16 are arranged within end rings 10, 11. Circular coil wedges of insulation material are fitted against the inner surface of windings 16, contiguous with the inner edges 18 of stator laminations 12. A continuous circular region is accordingly afforded within the stator to accommodate the rotor or armature 20.

Figure 2:
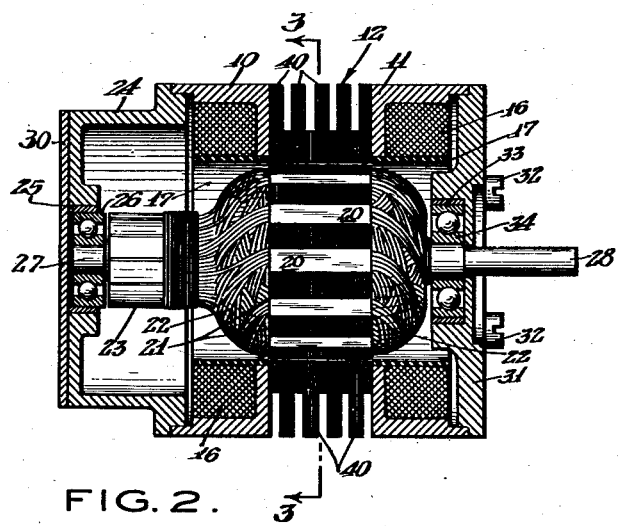
Fig. 2 is a horizontal cross-section through the motor, taken along the line 2—2 of Fig. 1.
Figure 3:
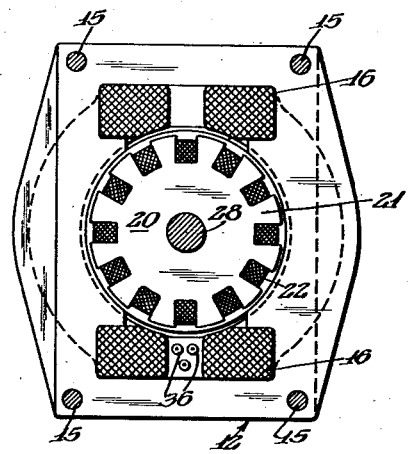
Fig. 3 is a vertical cross-section through the motor, taken along the lines 3—3 of Fig. 2.

Armature 20 comprises a series of slotted rotor laminations 21 with the usual armature winding 22, and a commutator 23. The width of the series of rotor laminations 21 is preferably equal to the width of stator lamination series 12, as shown in Fig. 2. Efficient electromagnetic coupling and motor operation is accordingly afforded between the rotor and stator laminations, with a minimum of eddy current and hysteresis losses and heating. Commutator end bell 24 contains a bearing sleeve 25 in which a sealed ball-bearing 26 is mounted, rotatably supporting one end 27 of the rotor shaft 28. End bell 24 is preferably an aluminum casting for lightness, with bearing sleeve 25 pressed into it. End bell 24 is fitted against end ring 10 and secured thereto by screws 29. A cover plate 30 is attached to the end of commutator end bell 24, protecting the bearing and the corresponding opening in the bell from the exterior.

A drive shaft end bell 31 is fitted against the open end of stator end ring 11 and secured thereto by screws 32. Bell 31 is also preferably an aluminum casting into which a bearing housing or sleeve 33 is pressed. A sealed ball-bearing 34 is mounted within sleeve 33 rotatably supporting drive shaft 28 of the rotor 20. The usual brushes are provided for commutator 23, supported in diametrically opposed holders 35. The brushes and stator windings 16 are connected in the desired circuital relation. External electrical connection is made to the motor through leads 36 projecting from opening 37 in end bell 31.

Figures 4, 5:
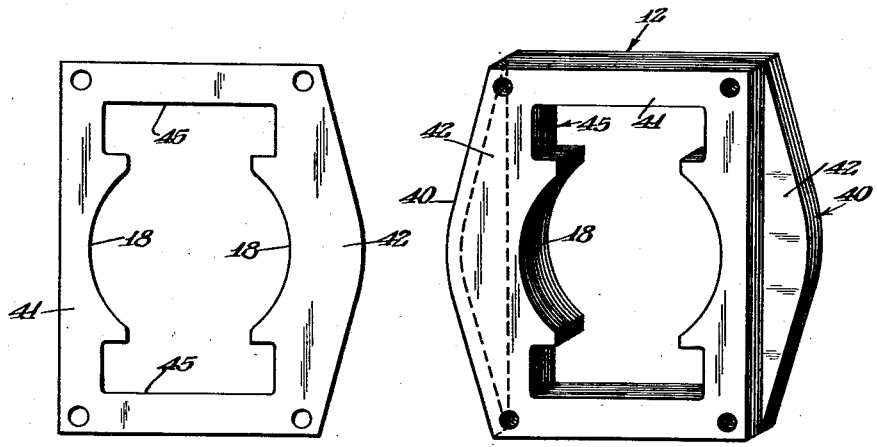
Fig. 4 is a plan view of a stator lamination of the motor.
Fig. 5 is a perspective view of a series of stator laminations.

An important feature of the present invention resides in the arrangement of the stator plates to provide efficient heat radiation for the motor. The stator lamination series 12 is arranged with spaced cooling fins 40 projecting from the motor assembly. The cooling fins 40 provide an increased radiating surface for dissipating heat generated by the motor. The stator lamination plates are all of identical size and shape. Fig. 4 is a plan view showing a single lamination plate 41. The lamination plates 41 are generally of a rectangular shape, with one side 42 thereof projecting beyond the normal rectangular form. The interior of laminations 41 are stamped out in an outline which is symmetrical along both the vertical and horizontal axes, for simplifying their alignment as a stator.

The projections 42 of each stator lamination 41 compose cooling fins 40 when stacked together as shown in Fig. 5. In practice, five or six laminations are grouped together to form a section corresponding to a fin 40. It is, of course, to be understood that a larger or smaller number of lamination plates may be so grouped, depending upon design requirements or preferences. Successive lamination groups are arranged with their projecting portions 42 disposed 180° apart, i. e., on opposite sides, as illustrated in Figs. 2 and 5. In this manner only a single type and size of lamination plate 41 need be stocked or otherwise used in assembling or servicing the motors, regardless of their rating, or length. The projecting cooling fins 40 effectively dissipate the heating of the motor, permitting a higher power output rating for a given motor size.

Motors of different ratings are readily constructed with the same components. The simplified motor construction of the invention permits motors to be assembled in any practicable desired length, using components of the same cross-section. The range of ratings and sizes of the motors is accomplished by selecting the length of its stator lamination series 12, and the corresponding lamination series 21 of its rotor. End rings 10, 11, the end bells 24, 31, are the same for all the motors, as are the individual laminations for the stators and rotors. When it is desired to build a motor of greater rating, it is simply necessary to stack the stator and rotor laminations into a series of greater length; for smaller ratings, the length is correspondingly smaller.

The laminations are stacked in alignment on a suitable mandril, and compressed between end rings 10, 11 with riveted pins 15, resulting in a solid integral stator unit of predetermined length. The stator windings 16 are then inserted within the respective end rings, and between the slots 45 in the stator laminations. Coil wedges 17 are thereupon mounted in position, completing the solid, rugged stator unit. The armature is similarly constructed to its requisite length, with the central laminated section 21 corresponding in length to the length of the stator lamination series 12. The different motor sizes are accordingly all manufactured with a minimum of components of distinct type, size or dimension. This materially facilitates maintenance and servicing of the different sized motors.

The wire used for windings 16 and 22 are preferably coated with glass enamel and insulated with fiber glass, permitting higher safe operating temperatures. After the windings are formed, they are vacuum impregnated and slowly baked at a high temperature, resulting in a solid insulated body. Also the minimizing of voids in the motor and windings reduces the possibility of movement of the windings in service, particularly the stator windings, and the resultant danger of damage to the insulation. The cooling fins 40 constitute a substantial portion of the motor framework, and effectively dissipate the motor heat. The combination with the other advantages, permits efficient operation of the motor at much higher temperatures than heretofore practicable.

Motors designed in accordance with the present invention have intermittent duty ratings of very high efficiencies. For example, fractional horse power direct current motors constructed in accordance with the invention, operate in service at efficiencies of the order of 80 to 85%; and similar motors with ratings above one horse power, having even greater efficiencies, e. g., above 90%. The high efficiency, lightweight, and compactness of the invention motors obviously render them most advantageous to use in modern aircraft.

Although only one embodiment of the invention has been set forth herein in detail, it is to be understood modifications may be made falling within the broader spirit and scope of the invention as set forth in the following claims.

What I claim is:

1. An electric motor comprising a frame incorporating a series of stator laminations of substantially the same shape and size arranged in successive similar groups with alternated projections contsituting an extended heat radiating surface for the motor, end rings of similar cross-sectional shape arranged against each end of the stator lamination series, the outermost extending edges of the projections of said laminations being arranged with substantially the same width and cross-sectional shape to correspond with that of said end rings and constitute a substantially uniform exterior surface for the motor, and means securing said stator laminations and end rings together.

2. An electric motor comprising a frame incorporating a series of stator laminations of substantially the same shape and size arranged in successive similar groups with alternated projections constituting an extended heat radiating surface for the motor, end rings of similar cross-sectional shape arranged against each end of the stator lamination series, the outermost extending edges of the projections of said laminations being arranged with substantially the same width and cross-sectional shape to correspond with that of said end rings and constitute a substantially uniform exterior surface for the motor, and means securing said stator laminations and end rings together, a pair of end bells each secured to one of said end rings, and an armature rotatably supported in said end bells.

3. An electric motor comprising a frame incorporating a series of stator laminations, said stator laminations all being substantially rectangular in shape with one side thereof projecting substantially beyond its basic rectangular form, said stator laminations being arranged in groups with the projecting lamination sides correspondingly juxtaposed, said groups being set up in a series with the projecting sides of each group alternated 180° with respect to those of the adjacent groups, whereby an array of distinct heat radiating fins are constituted for the motor, end rings of similar cross-sectional shape arranged against each end of the stator lamination series, the outermost extending edges of the projections of said laminations being arranged with substantially the same width and cross-sectional shape to correspond with that of said end rings and constitute a substantially uniform exterior surface for the motor, and means securing said stator laminations and end rings together.

4. An electric motor including a frame comprising a stacked series of basically rectangular congruent stator laminations, each lamination having one side thereof projecting substantially beyond its basic rectangular form; said laminations being arranged in groups with such projecting sides juxtaposed, the projecting sides of adjacent groups extending in opposite directions, whereby a series of spaced distinct heat radiating fins are provided for the motor; end rings basically rectangular in shape disposed against each end of said series of stator laminations, each end ring having a pair of opposite sides projecting beyond its basic rectangular form and congruent with the opposed projecting sides of the lamination groups whereby a substantially uniform exterior surface is provided for said motor; and means securing said stator laminations and end rings together.

5. An electric motor including a frame comprising a stacked series of basically rectangular congruent stator laminations, each lamination having one side thereof projecting substantially beyond its basic rectangular form; said laminations being arranged in groups with such projecting sides juxtaposed, the projecting sides of adjacent groups extending in opposite directions, whereby a series of spaced distinct heat radiating fins are provided for the motor; end rings basically rectangular in shape disposed against each end of said series of stator laminations, each end ring having a pair of opposite sides projecting beyond its basic rectangular form and congruent with the opposed projecting sides of the lamination groups whereby a substantially uniform exterior surface is provided for said motor; means securing said stator laminations and end rings together; a pair of end bells each secured to one of said end rings; and an armature rotatably supported in said end bells.

6. An electric motor including a frame comprising a stacked series of basically rectangular congruent stator laminations, each lamination having one side thereof projecting substantially beyond its basic rectangular form; said laminations being arranged in groups with such projecting sides juxtaposed, the projecting sides of adjacent groups extending in opposite directions, whereby a series of spaced distinct heat radiating fins are provided for the motor; end rings basically rectangular in shape disposed against each end of said series of stator laminations, each end ring having a pair of opposite sides projecting beyond its basic rectangular form and congruent with the opposed projecting sides of the lamination groups whereby a substantially uniform exterior surface is provided for said motor; means securing said stator laminations and end rings together; a pair of end bells each secured to one of said end rings; and an armature rotatably supported in said end bells, said armature having a stacked series of laminations coextensive with said stacked series of stator laminations for coaction with the stator.

7. An electric motor including a frame comprising a stacked series of basically rectangular congruent stator laminations, each lamination having one side thereof projecting substantially beyond its basic rectangular form; said laminations being arranged in groups with such projecting sides juxtaposed, the projecting sides of adjacent groups extending in opposite directions, whereby a series of spaced distinct heat radiating fins are provided for the motor; said stator laminations being formed with substantially circular cut out portions to receive a rotatable armature and with oppositely disposed recesses to receive a stator winding; end rings basically rectangular in shape disposed against each end of said series of stator laminations, each end ring having a pair of opposite sides projecting beyond its basic rectangular form and congruent with the opposed projecting side of the lamination groups whereby a substantially uniform exterior surface is provided for said motor; each of said end rings being formed with a recess to receive a portion of a stator winding; and means securing said stator laminations and end rings together.

ROBERT L. DRAKE.